United States Patent
Washlow et al.

(10) Patent No.: US 9,135,818 B2
(45) Date of Patent: Sep. 15, 2015

(54) RADAR DETECTOR THAT INTERFACES WITH A MOBILE COMMUNICATION DEVICE

(71) Applicant: Cobra Electronics Corporation, Chicago, IL (US)

(72) Inventors: Sally Ann Washlow, Oak Park, IL (US); Ronald Byron Kabler, Lawrence, KS (US); Robert Ryan Brandys, Hinsdale, IL (US); Monica Marie Vondruska, Denver, CO (US)

(73) Assignee: Cobra Electronics Corporation, Chicago, IL (US)

( * ) Notice: Subject to any disclaimer, the term of this patent is extended or adjusted under 35 U.S.C. 154(b) by 0 days.

(21) Appl. No.: 13/840,640

(22) Filed: Mar. 15, 2013

(65) Prior Publication Data

US 2013/0211707 A1 Aug. 15, 2013

Related U.S. Application Data

(63) Continuation of application No. 13/518,167, filed as application No. PCT/US2010/060952 on Dec. 17, 2010.

(60) Provisional application No. 61/289,278, filed on Dec. 22, 2009.

(51) Int. Cl.
*G01S 7/40* (2006.01)
*G01S 7/00* (2006.01)
(Continued)

(52) U.S. Cl.
CPC .......... *G08G 1/0967* (2013.01); *G01C 21/3415* (2013.01); *G01S 7/003* (2013.01); *G01S 7/02* (2013.01); *G01S 7/022* (2013.01); *G08G 1/052* (2013.01)

(58) Field of Classification Search
CPC ........... G01S 7/003; G01S 7/02; G01S 7/021; G01S 7/022; G01S 7/40; G01C 21/26; G01C 21/34; G01C 21/3407; G01C 21/3415; G08G 1/01; G08G 1/052; G08G 1/09; G08G 1/0962; G08G 1/0967
USPC .......... 455/403, 422.1–426.1; 342/13–20, 89, 342/175, 195, 70; 709/201, 202, 203; 340/425.5, 426.1, 426.18, 426.2, 901, 340/905, 500, 531, 539.1, 539.11, 539.13
See application file for complete search history.

(56) References Cited

U.S. PATENT DOCUMENTS 3,956,626 A 5/1976 Ross
5,021,961 A 6/1991 Ross et al.
(Continued)

FOREIGN PATENT DOCUMENTS

JP A-2003-132488 5/2003
JP A-2006-058191 3/2006
(Continued)

OTHER PUBLICATIONS

Blog Entry "Radar detector interface to iPhone," by Beamerboy on Tuesday, Aug. 25, 2009, www.trapster.com, printed on Nov. 5, 2009.
(Continued)

*Primary Examiner* — Bernarr Gregory
(74) *Attorney, Agent, or Firm* — Hitchcock Evert LLP (57) ABSTRACT

An electromagnetic signal detector that interfaces with a mobile communication device that includes a communication element. The communication element transmits data between the electromagnetic signal detector and the mobile communication device via a first communication standard. A user interface of the mobile communication device communicates the data to a user of the electromagnetic signal detector. The mobile communication device communicates with a communication network via a second communication standard. The first communication standard differs from the second communication standard.

48 Claims, 3 Drawing Sheets

(51) Int. Cl.
  *G08G 1/0967* (2006.01)
  *G01S 7/02* (2006.01)
  *G08G 1/052* (2006.01)
  *G01C 21/34* (2006.01)

(56) References Cited

U.S. PATENT DOCUMENTS

| | | | |
|---|---|---|---|
| 5,151,701 A | 9/1992 | Valentine et al. | |
| 5,206,651 A * | 4/1993 | Valentine et al. | 342/20 |
| 5,218,467 A | 6/1993 | Ross et al. | |
| 5,229,947 A | 7/1993 | Ross et al. | |
| 5,250,951 A | 10/1993 | Valentine et al. | |
| D366,659 S | 1/1996 | Ross et al. | |
| 5,510,793 A | 4/1996 | Gregg, III et al. | |
| 5,515,402 A | 5/1996 | Chester | |
| 5,784,021 A | 7/1998 | Oliva | |
| 5,815,092 A | 9/1998 | Gregg, III et al. | |
| 5,859,628 A | 1/1999 | Ross et al. | |
| 5,943,653 A | 8/1999 | Ross et al. | |
| 5,977,884 A | 11/1999 | Ross | |
| 6,118,403 A | 9/2000 | Lang | |
| 6,201,493 B1 | 3/2001 | Silverman | |
| 6,204,798 B1 | 3/2001 | Fleming | |
| 6,265,989 B1 | 7/2001 | Taylor | |
| 6,266,617 B1 | 7/2001 | Evans | |
| 6,384,776 B1 | 5/2002 | Martin | |
| 6,400,304 B1 | 6/2002 | Chubbs, III | |
| 6,442,485 B2 | 8/2002 | Evans | |
| 6,469,653 B1 | 10/2002 | Haynes | |
| 6,480,144 B1 * | 11/2002 | Miller et al. | 342/70 |
| 6,498,569 B2 | 12/2002 | Dijkstra | |
| 6,567,035 B1 | 5/2003 | Elliott | |
| 6,670,905 B1 | 12/2003 | Orr | |
| 6,675,085 B2 | 1/2004 | Straub | |
| 6,748,322 B1 | 6/2004 | Fernandez | |
| 6,845,317 B2 | 1/2005 | Craine | |
| 6,895,324 B2 | 5/2005 | Straub | |
| 6,943,723 B2 | 9/2005 | Kim et al. | |
| 6,980,092 B2 * | 12/2005 | Turnbull et al. | 340/425.5 |
| RE39,038 E | 3/2006 | Fleming, III | |
| 7,042,345 B2 | 5/2006 | Ellis | |
| 7,058,356 B2 | 6/2006 | Slotznick | |
| 7,171,187 B2 | 1/2007 | Haave et al. | |
| 7,183,942 B2 | 2/2007 | Rock et al. | |
| 7,301,494 B2 * | 11/2007 | Waters | 342/20 |
| 7,468,659 B2 | 12/2008 | Haave et al. | |
| 7,471,236 B1 | 12/2008 | Pitt et al. | |
| 7,489,993 B2 | 2/2009 | Coffee et al. | |
| RE40,653 E | 3/2009 | Fleming, III | |
| 7,702,044 B2 * | 4/2010 | Nallapureddy et al. | 342/20 |
| 7,764,219 B2 | 7/2010 | Pitt et al. | |
| RE41,905 E | 11/2010 | Fleming, III | |
| 7,899,450 B2 * | 3/2011 | Pitt et al. | 455/422.1 |
| 7,965,222 B2 | 6/2011 | Pitt et al. | |
| 7,999,721 B2 | 8/2011 | Orr | |
| 8,099,466 B2 | 1/2012 | Tenereillo et al. | |
| 8,255,155 B1 | 8/2012 | Crane et al. | |
| 8,373,588 B2 | 2/2013 | Kuhn | |
| 8,442,524 B2 | 5/2013 | Jendbro et al. | |
| 8,515,414 B2 * | 8/2013 | Pitt et al. | 455/422.1 |
| 8,525,723 B2 * | 9/2013 | Orr et al. | 342/20 |
| 8,842,004 B2 * | 9/2014 | Kabler et al. | 340/539.13 |
| 2001/0030624 A1 | 10/2001 | Schwoegler | |
| 2002/0135504 A1 * | 9/2002 | Singer | 342/20 |
| 2002/0152264 A1 * | 10/2002 | Yamasaki | 709/203 |
| 2003/0052797 A1 | 3/2003 | Rock et al. | |
| 2003/0139150 A1 | 7/2003 | Rodriguez et al. | |
| 2003/0214430 A1 | 11/2003 | Husted et al. | |
| 2003/0218562 A1 | 11/2003 | Orr | |
| 2004/0107037 A1 | 6/2004 | Straub | |
| 2004/0254729 A1 | 12/2004 | Browne et al. | |
| 2005/0242984 A1 * | 11/2005 | Waters | 342/20 |
| 2007/0046531 A1 | 3/2007 | Yu | |
| 2007/0109187 A1 | 5/2007 | Murphy | |
| 2007/0216521 A1 | 9/2007 | Guensler et al. | |
| 2007/0222639 A1 | 9/2007 | Giles et al. | |
| 2009/0016418 A1 | 1/2009 | Silver | |
| 2010/0188265 A1 | 7/2010 | Hill et al. | |
| 2010/0214148 A1 | 8/2010 | Kuhn | |
| 2010/0214149 A1 | 8/2010 | Kuhn | |
| 2010/0242906 A1 | 9/2010 | Konezny | |
| 2010/0317420 A1 | 12/2010 | Hoffberg | |
| 2011/0149933 A1 | 6/2011 | Pitt et al. | |
| 2012/0268306 A1 | 10/2012 | Coburn et al. | |
| 2012/0326889 A1 | 12/2012 | Kabler et al. | |
| 2013/0207829 A1 | 8/2013 | Kabler et al. | |
| 2013/0214939 A1 | 8/2013 | Washlow et al. | |

FOREIGN PATENT DOCUMENTS

| | | |
|---|---|---|
| JP | A-2008-269178 | 11/2008 |
| JP | A-2009-097865 | 5/2009 |
| JP | A-2009-277059 | 11/2009 |
| WO | 2008137996 A1 | 11/2008 |
| WO | 2011071826 A1 | 6/2011 |
| WO | 2011087714 A1 | 7/2011 |

OTHER PUBLICATIONS

Radar Active Website, May 15, 2010, www.radaractive.com, as saved by Web.archive.org, printed on Jan. 21, 2013.

"Ford Prototype Car Talks to Other Cars," Jan. 26, 2011, www.ceoutlook.com, as printed on Feb. 3, 2011.

"Ford's intelligent vehicles communicate wirelessly, shoot hula hoops out of tailpipes (video)," Jan. 27, 2011, www.engadget.com, as printed on Jan. 21, 2013.

Mumble Webpage, http://muble.sourceforge.net, printed on Oct. 15, 2013.

Entry for "Multimedia Messaging Service" in Wikipedia at Wikipedia.org, retrieved on May 9, 2014.

* cited by examiner

RADAR DETECTOR THAT INTERFACES WITH A MOBILE COMMUNICATION DEVICE

CROSS-REFERENCE TO RELATED APPLICATION

This application is a continuation of U.S. application Ser. No. 13/518,167, entitled "Radar Detector That Interfaces With A Mobile Communication Device" and filed on Aug. 9, 2012, now U.S. Pat. No. 8,970,422, which claims the benefit of priority from U.S. Provisional Application No. 61/289,278, entitled "Radar Detector That Interfaces With A Mobile Communication Device" and filed on Dec. 22, 2009.

FIELD OF THE INVENTION

This invention relates generally to the field of sensing equipment meant to alert motor vehicle operators and passengers to potential threats and safety risks such as law enforcement speed monitoring activity, the presence of emergency vehicles, traffic hazard warning devices, and other warnings or hazards. This invention further relates to the field of radar detector interfaces, in which sensing equipment enables an interface to alert motor vehicle operators to detailed threats for specific geographic locations.

BACKGROUND

Conventional radar detectors detect electromagnetic signals (such as microwave signals) or laser signals transmitted from radar or laser-type speed measurement equipment, such as police radar signals. Thus, radar detectors serve to provide advance warning to drivers who are being monitored by police radar. However, radar detectors are an imperfect technology. Radar detectors typically have interfaces that limit the amount of information provided to a motor vehicle operator and/or limit the ease with which a user may customize the use of the radar detector. However, increasing the size of a radar detector's display interface may be cost prohibitive.

Those skilled in the art will recognize that for many years there have been a number of tools and/or types of sensing equipment used by drivers to provide an alert to these sorts of traffic control devices, with radar/laser detectors the most common. As used herein, the terms radar detector and electromagnetic signal detector will be used interchangeably to refer to any of a number of known signal detection units capable of detecting electromagnetic signals in the X-band, K-band or Ka-band. Furthermore, the terms radar detector and electromagnetic signal detector will also be used interchangeably to refer to radar and/or laser detectors, and could refer to any electromagnetic wave detector or light wave detector. Examples of known technology in this area include U.S. Pat. Nos. 5,784,021 and 5,151,701.

SUMMARY

A radar detector is fundamentally a device that turns data into actionable information. An external mobile communication device, such as a cellular telephone or smart phone, may be used as a radar detector interface to address some radar detector problems and/or limitations. Radar detector data is communicated to a mobile communication device that includes a display screen capable of displaying significant quantities of information about law enforcement speed monitoring activities and potential safety risks at a geographic location in an easy-to-understand format. This detailed information will help motor vehicle operators minimize the risks associated with law enforcement speed monitoring activity and reduce the probability that a radar detector user will fall into a police speed trap. The mobile communication device's display screen, which is comparatively large when compared to current radar detector displays, will enable the user to more easily customize the operation of the radar detector to the user's specific needs and may also lead to larger zones of safe driving in compliance with local laws; a goal sought by all traffic regulating authorities. Furthermore, because many mobile communication devices use similar colors, color gradients, fonts, and layouts, many users of such devices are already familiar and comfortable with the display of information in these formats.

It is an object of the present invention to overcome potential problems associated with radar detectors.

It is a further object of the present invention to increase the amount of information provided by a radar detector to a radar detector user. It is a further object of the present invention to provide data from a radar detector to a radar detector user in an easier-to-understand manner.

It is a further object of the present invention to improve the format of data from a radar detector to a user improving the user interface such as through a mobile communication device.

It is yet a further object of the present invention to provide detailed data to a mobile communication device from a radar detector.

It is an additional object of the present invention to increase the ease with which a radar detector user can customize the use of a radar detector.

It is yet an additional object of the present invention to enhance the safety of the driving experience through the knowledge and advanced warning of potential threats such as police speed traps, emergency vehicles, school buses, traffic hazards, and other locations such as school zones, daycares, hospitals, red light cameras, and speed cameras.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
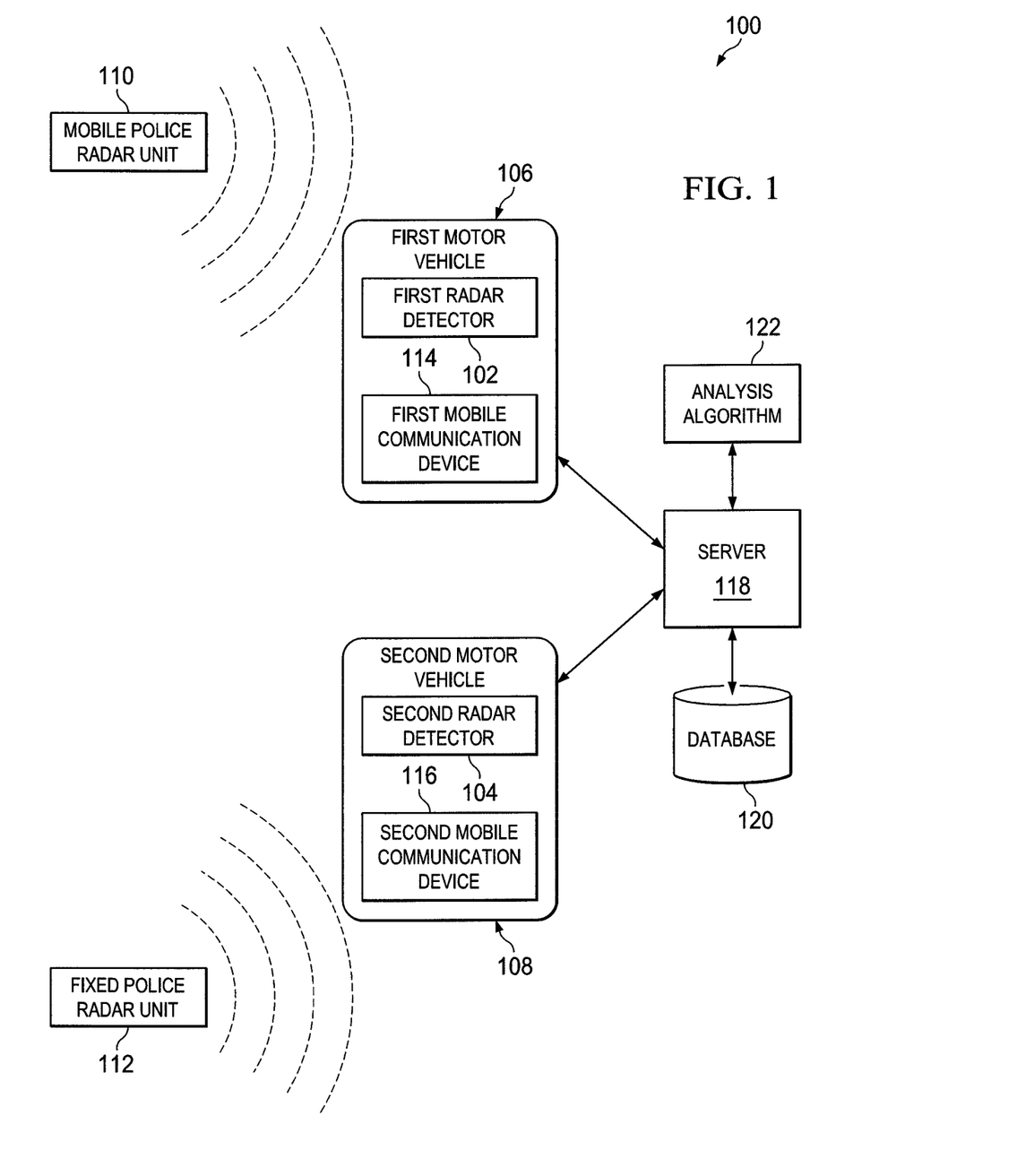
FIG. 1 is a block diagram depicting an embodiment of the system of the present invention.

With reference to FIG. 1, a block diagram depicts the system 100 according to an embodiment of the present invention. The depicted system 100 includes a first radar detector 102 and a second radar detector 104. The first radar detector 102 is used by a first motor vehicle 106 and the second radar detector 104 is used by a second motor vehicle 108. Electromagnetic signal devices depicted in FIG. 1 include a mobile police radar unit 110, such as a police motorcycle equipped with a radar gun, and a fixed police radar unit 112, such as a speed camera, that are situated towards the road on which the motor vehicles 106-108 are traveling. The radar detectors 102-104 may detect electromagnetic signals emitted from the radar units 110-112.

The system 100 may also include a first mobile communication device 114, a second mobile communication device 116, a server 118, a database 120, and an analysis algorithm 122. The mobile communication devices 114-116 may be a mobile phone, a cellular phone, a smart phone, a satellite phone, a navigation system, a personal digital assistant, a portable computer, a laptop computer, a tablet computer, and/or any other device with a user interface and the capability to wirelessly communicate. The mobile communication devices 114-116 enable the radar detectors 102-104 to communicate with the users of the mobile communication devices 114-116 via the corresponding user interfaces of the mobile communication devices 114-116. Many radar detector users already own and regularly use mobile communication devices 114-116, such as mobile phones, and therefore may not need to purchase any such mobile communication devices 114-116 to interface with the radar detectors 102-104. As one skilled in the art will recognize, the system 100 may include any number of radar detectors 102-104, motor vehicles 106-108, electromagnetic emitting devices 110-112, mobile communication devices 114-116, servers 118, databases 120, and analysis algorithm 122 and should not be limited to the illustrative example provided in FIG. 1.

The first radar detector 102 communicates with the first mobile communication device 114 via a first communication standard, such as the BLUETOOTH® communication standard, the ZIGBEE® communication standard, the WiFi communication standard, or any other communication standard. One skilled in the art will recognize that the first communication standard may include hard-wired and wireless communication and remain within the scope and spirit of the invention. Although specific communication standards may be identified for illustrative examples herein, one skilled in the art will recognize that other communication standards may be employed and remain within the scope and spirit of the invention. Similarly, the second radar detector 104 communicates with the second mobile communication device 116 via the first communication standard, such as the BLUETOOTH® communication standard. In contrast to providing each of the radar detectors 102-104 with the capability to communicate via a wide area communication network, which may be complicated and cost prohibitive, providing each of the radar detectors 102-104 with the capability to communicate via the BLUETOOTH® communication standard or other near-field communication standard may be easy and relatively inexpensive. Furthermore, many mobile communication devices 114-116 are either already provided with BLUETOOTH® communication capabilities or other communication capabilities, or may be easily and relatively inexpensively upgraded to provide BLUETOOTH® communication capabilities or other communication capabilities.

In some embodiments, the communication capabilities of radar detectors 102-104 and mobile communication devices 114-116 may be utilized to automatically execute the system and/or method in each of radar detectors 102-104 and mobile communication devices 114-116 when they are within a certain range, such as the communication range of the first communication standard. For example, radar detector 102 and mobile communication device 114 may contain paired radio frequency identification ("RFID") components. When the range between radar detector 102 and mobile communication device 114 is within the RFID signal range, the RFID components cause an application within mobile communication device 114 to automatically execute the system and/or method. For example, once the radar detector 102 and mobile communication device 114 are within range of one another, the devices could "pair" via the BLUETOOTH® standard. As one skilled in the art will recognize, the communication capabilities may be used to automatically execute all or portions of the system and/or method in radar detectors 102-104 and/or mobile communication devices 114-116 and remain within the scope and spirit of the invention. In addition, one skilled in the art will recognize that the communication capabilities may be used to permit, preclude or and/modify other operations of radar detectors 102-104 and/or mobile communication devices 114-116 and remain within the scope and spirit of the invention.

Figure 2:
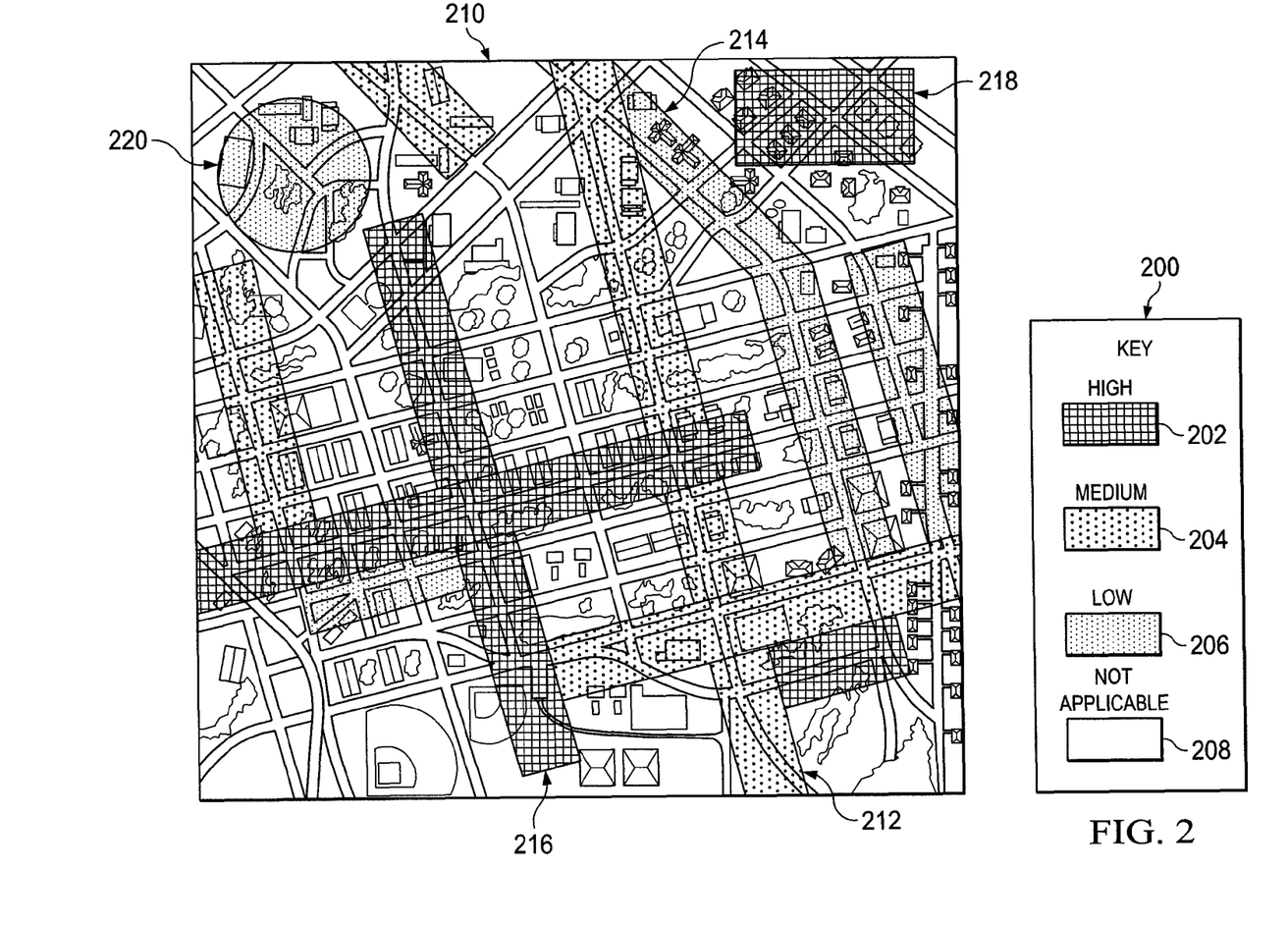
FIG. 2 is a mobile communication device interface depicting data of the present invention.

Each of the mobile communication devices 114-116 has its own user interface with which a user may already be familiar with using. In contrast, a user who recently purchased a typical radar detector may not become completely familiar with the new and potentially unfamiliar radar detector interface. This mobile communication device interface, which is distinct and separate from the user interface of any radar detector, may be much larger than the user interface of typical radar detectors. The mobile communication device user interface may be capable of displaying significantly more information than typical radar detectors can display, such as a navigation map that depicts various road segments and their corresponding predicted alert levels, as illustrated in FIG. 2 and discussed below. The mobile communication device user interface may also display a history of specific types of detected electromagnetic signals, such as the specific types of electromagnetic signals detected along a driven route.

The user interface of the mobile communication devices 114-116 may improve the aesthetic layout and informative presentation of data in a safe to utilize manner. The user interface may also display alerts based on various levels, such as a probability that a detected signal is a law enforcement speed monitoring signal, or levels of alerts based on colors, such as the range that includes yellow, yellow-orange, orange, orange-red, and red, or any other color scheme. In contrast to typical radar detectors that may be restricted to using a limited number of colors to depict various levels of alerts, the mobile communication device interface may be capable of displaying a virtually unlimited number of colors in the color spectrum. The user may select any color to be displayed by the user interface for each type of alert and/or to correspond with alert levels. Furthermore, the user interface may also display virtually any amounts of additional information, such as a compass heading and a calculation of the speed of the user's vehicle.

The user interface of the first mobile communication device 114 also enables the user of the first mobile communication device 114 to more easily enter user input to customize the operation of the first radar detector 102 without the need to utilize a user interface physically attached to or part of first radar detector 102. For example, the user may use the user interface of the first mobile communication device 114 to manage radar events on an interactive map, such as removing alerts that the user knows are false alerts and acknowledging alerts that the user knows are valid alerts via a mobile phone touch screen. Furthermore, the present invention may include one or more additional safety features, such as the ability to prevent or limit the ability to manage the system while the vehicle is in motion.

The user may also easily select from many options displayed by the mobile communication device user interface, such as whether to share radar events detected by the user's radar detector with servers and/or databases, which may convey these radar events to other mobile communication devices. Selecting to share radar events with other mobile communication devices may enable each of the mobile communication devices 114-116 to communicate their detected radar events via the second communication standard to the server 118, which may be a centralized server that aggregates these radar events and provides threat or predicted alert levels to the mobile communication devices 114-116 in a communication network. The aggregation of radar events may provide each of the mobile communication devices 114-116 with information about detected or predicted radar events at specific locations long before the corresponding radar detectors 102-104 are even capable of detecting these radar events. One skilled in the art will recognize that the radar detectors 102-104 and/or the mobile communication devices 114-116 may have a location determining unit, such as a Global Positioning System (GPS) receiver, to identify the current location of the radar detectors 102-104 and/or the mobile communication devices 114-116.

The options displayed by the mobile communication device user interface may also include an option to adjust the sensitivity of the user's radar detector based on specific city and highway environments. For example, a user may select specific road segments depicted in the map of FIG. 2 for lower sensitivity settings based on the user's experience in encountering false alerts while driving daily on those specific road segments. The user may also select to stream radar detector's audible alerts to external speakers, a piezoelectric device, and/or any other audio transducer. The options displayed by the larger user interface may also include an option to revise levels of alerts and outputs indicating alert levels, such as selecting green for a minor alert and/or muting audible alerts for minor alerts. Furthermore, the options displayed by the mobile communication device user interface may also include an option to either raise or lower the threat probabilities associated with each level of alerts, such as raising the threat probability level for an alert to qualify as a minor alert and lowering the threat probability level for an alert to qualify as a major alert, wherein the difference between a minor and major alert could be the number or color of visual displays lit and/or the loudness, pattern or tone of an audible alert. Additionally, the options displayed by the mobile communication device user interface may also include an option to select from various modes of operation, such as a proximity mode, a city mode, or a rural mode, and the mobile communication device user interface may be used to instruct the radar detectors 102-104 to enable or disable such mode selections. Furthermore, the modes may be selected by any combination of the first radar detector 102, the first mobile communication device 114, the server 118, or the user of the first mobile communication device 114. Additionally, the selection of the modes may be sent from the first radar detector 102, the first mobile communication device 114, and/or the server 118 to the first radar detector 102, the first mobile communication device 114, and/or the server 118. The first radar detector 102, the first mobile communication device 114, and/or the server 118 may include a map database used for determining when to enter a specific mode. For example, the first mobile communication device 114 switches from rural mode to city mode based on the current geographic location of the first mobile communication device 114 and a map database stored in the memory of the first mobile communication device 114. In another example, the user of the first mobile communication device 114 may enter a selection of city mode via the mobile communication device user interface even though the map database stored in the memory of the first mobile communication device 114 indicates that rural mode is still optimal for the current geographic location. One skilled in the art will recognize that the modes of operation and methods and/or options for selecting a mode of operation may vary and remain within the scope and spirit of the invention. One skilled in the art will also recognize that a map database may comprise data representing the roadways, geographic areas including specific geographical areas (such as country, state and/or municipality boundaries) and/or generic geographic areas (such as patterned geometric shapes), geographic points, and/or any other geographic information. One skilled in the art will also recognize that the size, shape, scope, calculation, and/or any defining parameters of geographic information in a map database may vary and remain within the scope and spirit of the present invention.

Because the first mobile communication device 114 may have a display screen that is comparatively larger than the screen found on current radar detectors, mobile communication device may enable the user to interface with the first radar detector 102, while the first radar detector 102 may have no display and a minimal number of small indicators and/or buttons, or no such indicators and/or buttons at all. If present, these small indicators may indicate whether the first radar detector 102 has sufficient electrical power to operate and whether the first radar detector 102 is paired with the first mobile communication device 114 by the BLUETOOTH® communication standard or another communication standard. The first radar detector 102 may also have small buttons for controlling the volume and/or muting the audible signals of the first radar detector 102.

Leveraging the network communication capabilities of any such mobile communication devices 114-116 is a cost-effective alternative to the expenses required to add such network communication capabilities to the radar detectors 102-104. The mobile communication devices 114-116 enable the radar detectors 102-104 to communicate data to and from the server 118 via a second communication standard that differs from the first communication standard. This second communication standard may have wide-area network capabilities, more range, or utilize a different communication protocol than the first communication standard. By utilizing the advantages of the second communication protocol through mobile communication devices 114-116, radar detectors 102-104 are able to gain these communication benefits. The mobile communication devices 114-116 enable the radar detectors 102-104 to communicate via the second communication standard over a communication network, such as a cellular telephone network, a satellite network, a Wi-Fi, another wireless network, and/or the Internet. As one skilled in the art will recognize, the system 100 may operate on one or more public networks, private networks or combinations of public and private networks. By leveraging the pre-existing communication capabilities of the mobile communication devices 114-116, the radar detectors 102-104 may inexpensively, quickly, and easily communicate data to the server 118.

Each of the radar detectors 102-104, the mobile communication devices 114-116, and the server 118 has the ability to initiate the process of sending or receiving data. The data may relate to location, speed, and/or acceleration of the motor vehicles 106-108, law enforcement activity, detectable electromagnetic signals, traffic conditions, any other hazards or alerts, and/or the status of the radar detector including operating mode, detection bands enabled and the like. Any or all such data may be identified and flagged at the discretion of the server 118 and/or the users of the radar detectors 102-104. As one skilled in the art will recognize, law enforcement activity includes speed traps, speed cameras, red light cameras, and any law enforcement personnel and/or device enforcing traffic laws. The data may also include driving patterns of vehicles 106-108 and/or specific driving patterns of individuals including patterns relating to the driver's typical reaction to specific alerts under specific circumstances. For example, the system may detect that the vehicle in which it is operating suddenly decelerated in response to a specific electromagnetic signal. This action by the vehicle could signify that the operator perceived an actual hazard or law enforcement activity, indicating that the signal is a legitimate source. This allows server 118 to utilize the database 120 to customize the predicted alert and/or threat levels it downloads to each user in order to adjust the alert levels to correlate to the advanced warning desired by the driver.

For example, the first radar detector 102 detects the mobile police radar unit 110 and the fixed police radar unit 112 and communicates data representing these detections to the first mobile communication device 114 via the BLUETOOTH® communication standard, and the first mobile communication device 114 communicates this data along with time and location data associated with the detections to the server 118 via a communication network. In another example, the second radar detector 104 also detects the fixed police radar unit 112 and communicates data representing this detection, including time and location data, to the second mobile communication device 116 via the BLUETOOTH® communication standard, and the second mobile communication device 116 communicates this data to the server 118 via a telephone communication network.

As one skilled in the art will recognize, radar detectors 102-104 and server 118 may leverage the various communication standards of the mobile communication devices 114-116 to communicate data in real-time or may communicate data based upon a schedule, a triggering event (such as reaching a data quantity threshold or a data storage size threshold), and/or a combination of a schedule and triggering event and remain within the scope and spirit of the invention. For example, the first radar detector 102 detects the mobile police radar unit 110 and the fixed police radar unit 112 and stores data representing these detections in internal memory, such as a buffer. Once a threshold quantity of data is reached or surpassed in the buffer, the first radar detector 102 communicates data representing these detections to the first mobile communication device 114 via the BLUETOOTH® communication standard, and the first mobile communication device 114 communicates this data to the server 118 via a telephone communication network. For another example, the second radar detector 104 may not receive any detection while traveling other roadways and stores data representing the absence of detections along the traveled path. At scheduled times the second radar detector 104 may communicate data representing the absence of detections to the second mobile communication device 116 via the BLUETOOTH® communication standard, and the second mobile communication device 116 communicates this data to the server 118 via a telephone communication network. In yet another example either mobile communication device 114-116 may buffer stored data, and wait until a threshold quantity of data is reached or surpassed in a buffer before communicating this data to the server 118 via a telephone communication network.

Upon receipt of such data, the server 118 stores the data into physical or electronic memory in the database 120, which may be part of the server 118 or separate from the server 118. The server administrators may also add other data to the database 120 (pertaining to law enforcement, safety, or driving in general) that are not measurable in the electromagnetic and laser spectrums of the radar detectors 102-104. Examples of this type of data include traffic flow conditions, dangerous intersections, and speed limits for various road segments. This additional data may be updated periodically by the server 118, automatically or through manual data entry. Some data changes frequently, like weather conditions and traffic conditions in local areas. Other data changes infrequently, such as "line segment" approximations of road maps and physical locations of school zones and/or law enforcement monitoring installations. These installations include but are not limited to red light and speed cameras. The data may include the data from the radar detectors 102-104, other data added by administrators as indicated above, and data from other data suppliers.

The server 118 executes the analysis algorithm 122 that periodically collects, sorts, organizes, and analyzes the data. The result of this analysis is stored in new records in database 120. In a preferred embodiment, the data is associated with database 120, but as one skilled in the art will recognize, the analysis algorithm 122 may incorporate or otherwise analyze data from sources other than the database 120 and remain within the scope and spirit of the invention. The analysis algorithm 122 may include statistical or predictive calculations relating to the likelihood of future threats, hazards, alerts, law enforcement speed monitoring activity, or traffic conditions. In the context of the present invention, the terms threat, predicted alert and predictive alert may be used interchangeably to refer to the likelihood that a user of the present invention will encounter a police radar unit, a road hazard or other event that will trigger an alert displayed on radar detectors 102-104 and/or the mobile communication devices 114-116.

Relative to the storage capacity and processing capacity of the radar devices 102-104, the storage capacity and the processing capacity of the mobile communication devices 114-116 may provide the capability to execute a complex analysis algorithm 122 using significant quantities of aggregated data, including data that is not readily available to the radar detectors 102-104. In addition, relative to the storage capacity and processing capacity of the radar devices 102-104 and the mobile communication devices 114-116, the storage capacity and the processing capacity of the database 120 and the server 118 may provide the capability to execute a complex analysis algorithm 122 using significant quantities of aggregated data, including data that is not readily available to either the radar detectors 102-104 and the mobile communication devices 114-116. However, it will be realized by those skilled in the art that as processing power increases, it may also be possible to run algorithm 122 on either radar detectors 102-104 and/or mobile communication devices 114-116 and still remain within the scope and spirit of the invention.

The output of the analysis algorithm 122 may include a calculated predictive alert level value or series of values that attempts to approximate and quantify the statistical likelihood of there being law enforcement activity and/or other safety risks in the geographic locations ahead of any of the motor vehicles 106-108. In some embodiments, the analysis algorithm 122 may tailor predicted alert values to an individual radar detector and/or driver based in part upon any considerations entered by the user and/or the user's stored driving patterns. This prediction may be based on a single factor or a combination of factors. As one skilled in the art will recognize, the prediction may be based on any data available to analysis algorithm 122, including but not limited to patterns of emission detections, geographic locations, signal analysis, user input, and any other data. One skilled in the art will recognize that signal analysis may include signal band analysis, signal frequency analysis, signal strength or intensity measurements, and/or any other signal analysis. For example, the received signal band may be compared to known signal regulations imposed by the FCC or other regulatory or licensing body. For instance, if the signal is in the X or K bands it may be a motion-sensing door, however, if the signal is in the Ka band it is less likely to be a motion-sensing door. For another example, the received signal band may be compared to previously identified signal bands stored in database 120. For instance, database 120 may have stored information associated with one geographic location regarding an X band signal that has a high probability of representing law enforcement activity and a Ka band signal that has a low probability of representing law enforcement activity. If a received signal is in the Ka band, the previously identified Ka band signals in the geographic location may factor in analysis algorithm 122 calculating a low probability of the received Ka band signal representing law enforcement activity.

In an embodiment, an alert may be based upon an analysis of speed limits for road segments in the geographic location associated with radar detectors 102-104. For example, database 120 may contain posted speed limits for the road segment that radar detector 102 is traveling along and recognize that radar detector 102 is approaching a lowered speed limit, server 118 may then communicate the approaching speed limit to mobile communication device 114, which can then provide an alert to the user of mobile communication device 114 of the approaching change in the speed limit. One skilled in the art will recognize that a road segment or road segments may refer to physical roadways and/or the data representations of physical roadways created and/or stored in server 118, radar detectors 102-104, mobile communication devices 114-116, and/or another computer hardware device. Mobile communication device 114 may also consider user inputs regarding when to provide a speed limit alert. For example, the user of mobile communication device 114 may input a condition that an alert not be provided unless the current vehicle speed is above the approaching speed limit or may input a condition that an alert not be provided unless there is also a prediction of law enforcement activity in the area. As one skilled in the art will recognize, database 120 may contain any number and type of various traffic regulations associated with geographic locations or specific road segments which may be communicated to a user via the alert outputs available to the user and remain within the scope and spirit of the invention. One skilled in the art will also recognize that default, system determined, and user conditions for alerts may vary and remain within the scope and spirit of the invention.

A third radar detector and a third mobile communication device (not depicted in FIG. 1) may derive the benefits from the system 100 based on detections made by the first radar detector 102 and the second radar detector 104 even when the third radar detector and the third mobile communication device approach the fixed police radar unit 112 for the very first time. The third mobile communication device may receive a predicted alert or threat level from server 118 and thereafter provide an alert for the fixed police radar unit 112 without the third radar detector having previously observed and recorded any band emissions from that geographic location. The predicted alert or threat level received by the third mobile communication device and communicated to the third radar detector may be based upon periodically received data from the server 118 pertaining to predicted probabilities and/or alert levels for potential threats in the local area. Therefore, the system 100 may provide benefits to mobile communication device users who have never traveled on a specific road segment before based on data from the multiple radar detectors 102-104 that have previously traveled on the specific road segment. In yet another example, an operator of a fourth mobile communication device (not depicted) may derive the benefits from system 100 based on detections made by radar detectors 102-104, even if that operator does not operate a radar detector of their own. Specifically, the fourth mobile communication device may receive periodic data from server 118, and display alerts in a manner similar to that described for the third mobile communication device. In this manner, fourth mobile communication device would be limited only in that it would not receive new detections of electromagnetic signals (because it is not communicating with an electromagnetic signal detector such as a radar detector) and would, therefore, be unable to generate or display alerts based on that data. Instead, fourth mobile communication device would rely only on historical data collected by other radar detectors and would display only predictive alerts based on this historical data and the analysis performed on this data by algorithm 122.

When signals are detected by one of radar detectors 102-104, an alert level may be based upon the predicted probability that the detected signals represent a law enforcement monitoring device or other safety risk. When signals are not detected, an alert level may be based upon the threat or predicted probability that a law enforcement monitoring device or other safety risk is within a vicinity determined by the radar detectors 102-104, the mobile communication devices 114-116, the server 118, and/or defined by a user. The resulting alert level may be defined in any number of levels whereby each alert level is correlated to a range of threat probabilities. In one embodiment, if there are two alert levels, a 0-50% threat probability may result in no alert or an ignore level and a 51-100% threat probability may represent an alert. In another embodiment, four alert levels may be defined by threat probability ranges 0-40% (no alert or an ignore level), 41-65% (minor alert), 66-85% (mid-level alert), and 86-100% (high alert). In yet another embodiment, five alert levels may be defined based upon ranges along a threat probability scale from −50 to 50, whereby threat probability ranges of −50 through −30 represent a no alert or an ignore level, threat probability ranges of −29 through −1 represent a minor alert, threat probability ranges of 1 through 30 represent a mid-level alert, threat probability ranges of 31 through 50 represent a high alert, and a threat probability of zero indicates that no stored data is available to analyze.

The analysis algorithm 122 may calculate a multitude of threat probabilities and/or associated alert levels based on specific subsets of the data, i.e. for specific times of the day, days of the week, or months of the year. The predicted alert and/or threat levels may also be based on data associated with specific geographic location boundaries. This process may create predicted alert and/or threat levels specific to grid regions bounded by latitude and longitude, specific to a rectangular, radial, or other shaped region, or specific to "road segments" where detailed map data is available. In addition, the analysis algorithm 122 may associate a weighted factor to various data to represent the strength and/or reliability of the data. For example, a diminishing weight factor may be associated with data based on the age of the data such that older data has a lower weight factor. Alternatively, data could be given weight based on actual driver reactions to the data. For example, if the system detects that an operator has slowed the vehicle immediately following detection of a particular electromagnetic signal, this may indicate that the signal corresponds to an actual hazard or law enforcement activity, suggesting that data relating to that particular signal may be given a greater weight. One skilled in the art will recognize that many variables may be considered to determine a weight factor for any data, different weight factors may be applied for different calculations, weight factors may change over time for all data or specific data, and multiple weight factors may be associated with any data to effect the overall weight of the evidence during analysis and remain within the scope and spirit of the invention.

In one example, the server 118 may provide the 95% threat probability predicted by analysis algorithm 122 for the fixed police radar unit 112 to the second mobile communication device 116 associated with the geographic location for the road segment currently traveled by the motor vehicle 108. The mobile communication device user may wish to respond differently to predicted threat probabilities, such as 95%, 50%, and 5%. For example, the user of the second radar detector 104 may program the second mobile communication device 116 to provide a minor alert level if there is a 50% threat or predicted alert probability, while the user of the first radar detector 102 may program the first mobile communication device 114 to provide a no alert or an ignore level if there is a 50% threat or predicted alert probability.

In addition, the mobile communication devices 114-116 may provide an alert based upon a high threat or predicted alert probability in the anticipated travel segment, wherein a travel segment may be a road segment on which the user is currently traveling, and may incorporate different actual distances depending on the speed of the vehicle, the mode in which the system is operating and/or any other relevant variables. For example, the second mobile communication device 116 may provide an alert prior to the second radar detector 104 receiving a radar signal from fixed police radar unit 112 when the second motor vehicle 108 is traveling towards the fixed police radar unit 112 with a determined 95% predicted threat probability. In addition, the second radar detector 104 may increase the given alert once a signal is received from the fixed police radar unit 112.

The alert levels and/or threat probability that the analysis algorithm 122 may predict and that the server 118 may communicate to the mobile communication devices 114-116 are supplementary to the normal operation of the radar detectors 102-104. For example, the mobile police radar unit 110 may arrive on a police motorcycle at a geographic location where electromagnetic signals have never been detected by the radar detectors 102-104 previously. However, the first radar detector 102 may still detect the mobile police radar unit 110 and provide an alert to the operator of the first motor vehicle 106 even before the first mobile communication device 114 communicates data representing this detection to the server 118. For example, the first radar detector 102 may determine that the detected signal is not stored in the internal memory of the first radar detector 102 and communicate an alert to the user based upon the internal analysis and settings of the first radar detector 102 for new or unrecognized signals. In one embodiment, a default setting of the first radar detector 102 would treat new or unrecognized signals as a threat and provide a default alert unless an internal analysis indicated that the signal is likely a false positive.

In addition, before the first radar detector 102 provides an initial alert to the user, it may further analyze the signal. The first radar detector 102 may recognize that a record relating to or describing that signal is not in its own database and therefore communicate an alert based upon the probability that a new electromagnetic signal is a police monitoring unit or other safety risk, or the first radar detector 102 may provide a default alert until additional data is received and analyzed.

In addition, while the first radar detector 102 is providing an initial alert to the user, it also may communicate the signal to the first mobile communication device 114. The first mobile communication device 114 may recognize that the signal is not in its own database and communicate an alert based upon the probability a new electromagnetic signal is a police monitoring unit or other safety risk, or the first mobile communication device 114 may provide a default alert until additional data is received and analyzed. The first mobile communication device 114 may send a different alert level than the first radar detector 102 determined, because the first mobile communication device 114 may utilize more aggregated data and/or a more thorough analysis algorithm 122 than the first radar detector 102, which may lead to differences in threat probability determinations.

In addition, while the first radar detector 102 is providing an initial alert to the user, it also may communicate the signal to the first mobile communication device 114, which may communicate the signal to the server 118 for further analysis by analysis algorithm 122. The analysis algorithm 122 may recognize that there is no record relating to or describing the signal in the database 120 and the server 118 may communicate a threat level and/or predicted alert level based upon the probability calculated by analysis algorithm 122 that a new electromagnetic signal is a police monitoring unit or other safety risk, or the server 118 may provide a default alert until additional data is received and analyzed by analysis algorithm 122. The server 118 may send a different threat level and/or predicted alert level than either the first radar detector 102 and/or first mobile communication device 114 determined, because the server 118 may utilize more aggregated data and/or a more thorough analysis algorithm 122 than the first radar detector 102 and/or the first mobile communication device 114, which may lead to differences in probability determinations.

As one skilled in the art will recognize, any combination of the first radar detector 102, the first mobile communication device 114, and the server 118 may analyze the signal using analysis algorithm 122 and determine its own alert level and remain within the scope and spirit of the invention. For example, the first radar detector 102 may conduct an initial analysis and communicate the detection data and initial alert level to the first mobile communication device 114 which communicates the initial alert to the user via its user interface and communicates the detection data to the server 118 without conducting any analysis. The server 118 then executes analysis algorithm 122 to conduct further analysis and communicates an updated threat level and/or predicted alert based upon the analysis to first mobile communication device 114 which communicates the updated alert to the user via its user interface.

Alternatively, the mobile police radar unit 110 may be turned off until the operator turns it on to specifically target a vehicle. This may prevent the first radar detector 102 from receiving the electromagnetic signal until the operator of the mobile police radar unit 110 targets a car in the vicinity. However, once the first radar detector 102 receives the signal and uploads it to server 118 via the first mobile communication device 114, the server 118 may provide an update based upon an analysis in server 118 to a memory component of the second mobile communication device 116 such that as the second radar detector 104 approaches the location of this threat, the second mobile communication device 116 provides an alert prior to the second radar detector 104 receiving the electromagnetic signal from the mobile police radar unit 110.

The server 118 communicates the threat probabilities and/or predictions calculated by analysis algorithm 122 based on specific geographic locations to each of the radar detectors 102-104 based on the corresponding geographic locations associated with each of the radar detectors 102-104. As one skilled in the art will recognize, geographic locations associated with the first radar detector 102 may include the geographic area in which the first radar detector 102 is currently located, geographic areas which the first radar detector 102 is approaching or likely to approach, geographic areas designated by the user of the first radar detector 102, and/or suggested by a mapping or navigation component or device. One skilled in the art will also recognize that the size, shape, scope, calculation, and/or any defining parameters of an associated geographic area may vary and remain within the scope and spirit of the present invention. Each of the radar detectors 102-104 periodically receives or downloads a subset of these threat probabilities and/or predicted alert levels calculated by analysis algorithm 122 from the server 118 via the mobile communication devices 114-116 that correspond to the current geographic locations associated with each of the radar detectors 102-104, including for example road segments currently traveled and road segments likely to be traveled in the future, and/or the particular time of day, day of week, or month of year. Each of the radar detectors 102-104 uses its location determining unit and corresponding timestamp data to provide real-time threat levels and/or predicted alert levels specific for the corresponding motor vehicles 106-108 using the radar detectors 102-104, on that day, at that time, at that geographic location, on that heading, at that speed and acceleration, under those weather and traffic conditions.

In an embodiment, the radar detectors 102-104 and/or the mobile communication devices 114-116 may be operably associated with a navigation component or device. In such an embodiment, the geographic location associated with the radar detectors 102-104 and/or the mobile communication devices 114-116 may include the route suggested by the navigation component or device. The analysis algorithm 122 may calculate threat levels and/or predicted alert levels based upon data associated with the roadway that the first radar detector 102 is currently located on and any roadways likely to be traveled, and may consider the speed, conditions, direction of travel, history of driving, and/or any other factors associated with travel on the road segments. The first radar detector 102 and/or the first mobile communication device 114 may prompt the navigation component or device to suggest alternate routes if an alert probability threshold is surpassed. Alternatively, the radar detector user may respond to threat levels and/or predicted alert levels associated with a primary route suggested by the navigation application by requesting the navigation application to suggest an alternative route.

One skilled in the art will recognize that the location determining unit may operate based on a relative location based system, a latitude/longitude system, another coordinate system, a map segment based system, a cellular or WiFi triangulation system, an accelerometer and compass system or any other system for identifying a location and/or any combination of location systems. In one embodiment, the radar detectors 102-104 and/or the mobile communication devices 114-116 use a Global Positioning System (GPS) receiver as the location determining unit. In another embodiment, the radar detectors 102-104 and/or the mobile communication devices 114-116 use a device determining the current map segment position as the location determining unit. One skilled in the art will recognize that the location determining unit may be part of the mobile communication devices 114-116, the radar detectors 102-104, and/or any component or device in operable association with the mobile communication devices 114-116 and/or the radar detectors 102-104.

For example, the server 118 may provide the threat levels and/or predicted alert levels predicted by analysis algorithm 122 for the mobile police radar unit 110 to the radar detector and/or mobile communication device within second motor vehicle 108 because the geographic locations for the second motor vehicle 108 indicate that the second motor vehicle 108 is currently approaching or may approach the mobile police radar unit 110. In another example, the server 118 no longer provides the threat levels and/or predicted alert levels for the fixed police radar unit 112 to the first motor vehicle 106 because the geographic locations for the first motor vehicle 106 indicate that first motor vehicle 106 has already passed and is currently moving away from the fixed police radar unit 112. In another example, mobile communication devices 114-116 may retrieve data from server 118 based on each of their current locations. Such data will generally be limited to data relevant to a particular geographic area or a road segment on which the particular mobile communication device is currently operating, or other user-defined grouping of data to prevent the unnecessary transfer of irrelevant data.

The server 118 may also communicate the threat levels and/or predicted alert levels based on geographic locations specific to a particular mobile communication device that is not directly communicating with any radar detector, based on a corresponding geographic location for the particular mobile communication device. In some embodiments, the particular mobile communication device must subscribe to a threat level and/or predicted alert level service. Although the particular mobile communication device may not directly communicate with any radar detector, the particular mobile communication device user may act as an additional data supplier by submitting a confirmation of law enforcement speed monitoring activity associated with the geographic location of the particular mobile communication device. As one skilled in the art will recognize, the particular mobile communication device may be any device that can be operably associated with the server 118, including a mobile phone, a cellular phone, a smart phone, a satellite phone, a navigation system, a personal digital assistant, a portable computer, a laptop computer, a tablet computer, and/or any other device with wireless connectivity.

Each of the radar detectors 102-104 and/or the mobile communication devices 114-116 may communicate an alert level to a corresponding user based on threat levels and/or predicted alert levels that correspond to the geographic locations of the radar detectors 102-104 and/or the mobile communication devices 114-116. The alert level resulting from the threat level and/or predicted alert level may be communicated to the user through a display, a mechanical response, and/or an audible or voice alert via the radar detector and/or the mobile communication device. For example, the second radar detector 104 flashes red and beeps rapidly while the second mobile communication device 116 displays a 95% alert level on a navigation map and provides a voice alert that identifies a 95% alert level when the second vehicle 108 approaches the fixed police radar unit 112. This will allow, in turn, motor vehicle operators to become more cognizant of traffic conditions by being warned in advance to adhere to the posted speed limits, to avoid collisions with or the obstruction of emergency vehicles and to avoid possible hazards such as accidents, weather and other road hazards. One skilled in the art will recognize that radar detectors 102-104 and/or the mobile communication devices 114-116 may communicate an alert level to another device which may provide an alert to the user of said other device. The other device may be a navigation device, a vehicle component, a mobile display device, a mobile audio device, and/or any device that can communicate with radar detectors 102-104 and/or the mobile communication devices 114-116, but may not be capable of communicating with server 118.

As one skilled in the art will recognize, the alert may be a color change on the second radar detector 104, such as a series of light-emitting diodes, and/or the information may be conveyed by the second mobile communication device's interface, such as a liquid crystal display, a projected image, and/or any display known or yet to be discovered, which may be utilized by the second radar detector 104 and/or the second mobile communication device 116, and will remain within the scope and spirit of the invention. As one skilled in the art will recognize, a mechanical response may be a vibration, a change to the vehicle's operation (such as automatically decelerating the vehicle as a safety risk approaches), and/or any other mechanical response known or yet to be discovered and will remain within the scope and spirit of the invention. As one skilled in the art will recognize, the audible alert may be a beep, buzz, voice response, and/or any other audible alert known or yet to be discovered and will remain within the scope and spirit of the invention.

The radar detectors 102-104 and/or the mobile communication devices 114-116 include data storage components such as a buffer or other form of memory and data processing components. In one embodiment, these components may contain a selected data set and be capable of processing all or portions of the analysis algorithm 122 within the radar detectors 102-104 and/or the mobile communication devices 114-116 for the data set in memory. For example, the first radar detector 102 may contain a data set in memory relating to the surrounding geographic area that includes threat levels and/or predicted alert levels within that geographic area. As the first radar detector 102 is in use it collects additional data relevant to the same geographic area and aggregates the collected data with the stored data, and executes the analysis algorithm 122 to calculate updated threat probabilities and threat levels based upon the aggregated data. This embodiment allows continued updating in a given area without connection to the server 118 permitting continued analysis without taking up the second communication network's bandwidth and/or analysis when connection to the server 118 is not available.

In another example, the first mobile communication device 114 may contain an even larger data set in memory relating to the surrounding geographic area that includes threat levels and/or predicted alert levels within that geographic area. As the first radar detector 102 is in use it collects additional data relevant to the same geographic area and communicates the additional data to the first mobile communication device 114 via the first communication standard. The first mobile communication device 114 aggregates the collected data with the stored data, and executes the analysis algorithm 122 to calculate updated threat probabilities and alert levels based upon the aggregated data. This embodiment also allows continued updating in a given area without connection to the server 118 permitting continued analysis without taking up the second communication network's bandwidth and/or analysis when connection to the server 118 is not available. Alternatively, a user of the system may elect to delay data updates until a certain time of day when, for example, data transfer rates may be improved. For another example, the user may elect to delay data updates until such time as they are able to use a Wi-Fi connection instead of the mobile communication device's data plan. Furthermore, it should be noted that any data retrieved will generally be stored in the mobile communication device's non-volatile memory so that all data is retained, even if the device is turned off or the mobile communication application is terminated.

Communication with the server 118 may be based upon a schedule to upload collected data to the server 118 and a schedule to download any updated data from the server 118. For example, if the server 118 predicts a change in alert levels in the geographic area to occur around 4:30 p.m., the server 118 may initiate a download of updated alert levels to the first mobile communication device 114 at 4:15 p.m., or if the device is powered off, the next time it is powered on. In addition, communication with the server 118 may be triggered by specified events. For example, as the first radar detector 102 approaches the geographic boundary of data within the currently stored data set, the first radar detector 102 may initiate communication with the server 118 via the first mobile communication device 114 in order to download an updated data set based upon the current geographic location of the first radar detector 102 and the direction of travel. As one skilled in the art will recognize, the extent and scope of the data set stored in memory of the radar detectors 102-104 and/or the mobile communication devices 114-116, and the extent of analysis conducted within the data processor of the radar detectors 102-104 and/or the mobile communication devices 114-116 may vary and remain within the scope and spirit of the present invention.

As one skilled in the art will recognize, the system and method may be effectuated with a specialized hardware device running specialized software, may be effectuated with a software application that can be loaded and executed in existing hardware, or any combination of hardware and software components and remain within the scope and spirit of the invention. For example, in an embodiment a software application is provided for a user to load onto mobile communication device 114. The software application can execute to communicate data to and from radar detector 102, communicate information regarding predicted alerts and other information via the user interface, receive user inputs via the user interface, analyze stored and received detection data, determine the time and location detection data is received, and communicate data to and from server 118 via the second communication standard. In another embodiment, a set of software applications is provided for a user to install on the user's existing radar detector 104 and mobile communication device 116 to facilitate the system and method of operation described.

FIG. 2 depicts one embodiment of a map illustration with overlaid alert levels which may be displayed on an interface associated with any of the mobile communication devices 102-104.

A key 200 shows the overlay styles and associates a meaning, such as the alert level, with each style of overlay. As one having skill in the art will recognize, any meaning may be associated with a given overlay style and remain within the scope and spirit of the invention. In the depicted embodiment, there are four overlay styles: an overlay design 202 associated with a high alert level, an overlay design 204 associated with a medium alert level, an overlay design 206 associated with a low alert level, and an overlay design 208 associated with a not applicable alert level due to a lack of data. As one skilled in the art will recognize, any number of overlays may be employed and remain within the scope and spirit of the invention. In addition, any overlay design may be used, including color overlays, line designs (such as those pictured), animations, degrees of opacity, other designs and/or any combination of colors and designs.

A map 210 depicts a street layout with portions overlaid with alert levels associated with the key 200. For example, overlay segment 212 has the overlay design 204 indicating that the road section covered by overlay segment 212 has a medium alert level, overlay segments 214 and 220 have the overlay design 206 indicating that the road sections covered by overlay segments 214 and 220 have a low alert level, and the overlay segments 216 and 218 have the overlay design 202 indicating that the road sections covered by overlay segments 216 and 218 have a high alert level. In addition, the portions of the map 210 not overlaid with overlay designs 202-206 are overlaid with overlay design 208 indicating that an alert level is not applicable due to a lack of data in areas covered by the overlay design 208. Overlay segments may be associated with specific road segments, such as those depicted by the overlay segments 212-216, or may be based upon an area evaluation, such as the rectangular overlay segment 218 and radial overlay segment 220 depicted in this embodiment. As one skilled in the art will recognize, overlay segments may correlate to individual road segments, grid sections of a map, geographic areas, shapes, and/or any design related to the map or the geographic area the map represents, and remain within the scope and spirit of the invention.

As one skilled in the art will recognize, the various overlay segments 212-220 may change which overlay design is displayed as a mobile communication device downloads an update from the server 118. For example, the analysis algorithm 122 may predict that a road section covered by a portion of the overlay segment 214 should be associated with a high alert level based upon data collected by the first radar detector 102. Accordingly, once the first mobile communication device 114 downloads the update, the relevant portion of the overlay segment 214 will depict the overlay design 202 indicating the high alert level, while the remainder of the overlay segment 214 will maintain the overlay design 206 indicating a low alert level. For an additional example, individual road segments may change color on the map 210 to indicate reevaluated predicted alert levels.

Figure 3:
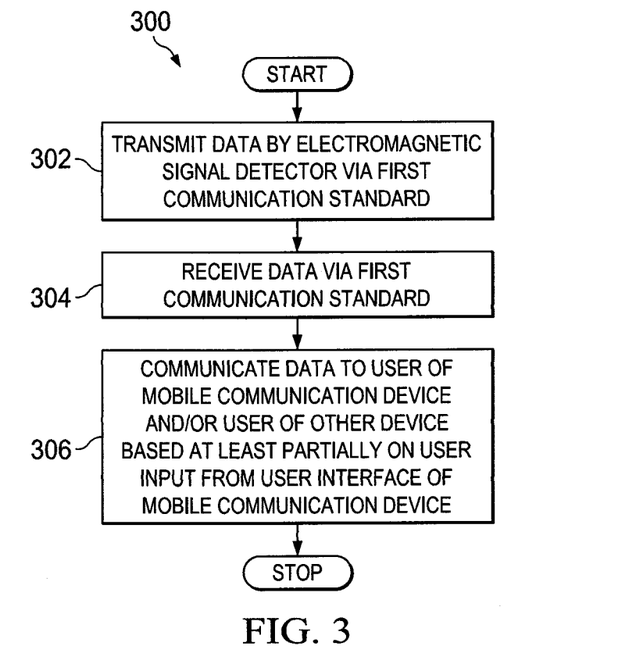
FIG. 3 is a flowchart depicting an embodiment of the process of the present invention.

FIG. 3 is a flowchart depicting an embodiment of process 300. The process 300 may be a method executed by the system 100 and/or a computer program product to provide predictions based on data analyzed from the radar detectors 102-104.

In box 302, data is transmitted via a first communication standard. For example, the first radar detector 102 communicates data that indicates detection of the fixed police radar unit 112 to the first mobile communication device 114 by the BLUETOOTH® standard.

In box 304, data is received via a first communication standard. For example, the first mobile communication device 114 receives the data that indicates detection of the fixed police radar unit 112.

In box 306, data is communicated to a user of a mobile communication device and/or a user of another device based at least partially on user input from a user interface of the mobile communication device. For example, the user interface of the mobile communication device 114 communicates the data that indicates detection of the fixed police radar unit 112 to the user of the mobile communication device 114. As one skilled in the art will recognize, the data may also include information received from other radar detectors associated with the system 100 which have passed through and/or any other data sources which are associated with or entered into the system 100.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the system, method, or computer program product described.

The invention claimed is:

1. An electromagnetic signal detector that interfaces with a mobile communication device, comprising:
    a communication element that facilitates communication of data between said electromagnetic signal detector and said mobile communication device via a first communication standard, wherein said mobile communication device is separate from said electromagnetic signal detector and wherein a user interface of said mobile communication device is operable to manage at least one operation of said electromagnetic signal detector, wherein said mobile communication device is operable to communicate with a communication network via a second communication standard, and wherein said first communication standard differs from said second communication standard, and
    wherein said mobile communication device further receives a prediction of an alert level from a server via said second communication standard, wherein said prediction is based on a geographic location associated with said mobile communication device, and wherein at least one of said user interface and said electromagnetic signal detector communicates said prediction to said user.

2. The electromagnetic signal detector of claim 1, wherein at least one of said user interface of said mobile communication device and said electromagnetic signal detector communicates said data to a user of said mobile communication device.

3. The electromagnetic signal detector of claim 2, wherein said data communicated to said user is based at least partially on a user input via said user interface.

4. The electromagnetic signal detector of claim 2, wherein said data communicated to said user is based at least partially on a mode of operation, wherein said mode of operation is determined by at least one of a user input, a geographic location associated with said mobile communication device, a speed, an acceleration, and a navigation route associated with a motor vehicle that is associated with said mobile communication device.

5. The electromagnetic signal detector of claim 1, wherein said electromagnetic signal is one of a radar wave and a light wave.

6. The electromagnetic signal detector of claim 1, wherein said mobile communication device is at least one of a mobile phone, a cellular phone, a smart phone, a satellite phone, a personal digital assistant, a navigation system, a mobile phone communication component, a portable computer, a laptop computer, and a tablet computer.

7. A mobile communication device that interfaces with an electromagnetic signal detector, comprising:
    a communication component that facilitates communication of data with said electromagnetic signal detector via a first communication standard, wherein said mobile communication device is separate from said electromagnetic signal detector; and
    a user interface that is operable to manage an operation of said electromagnetic signal detector and communicates information regarding said operation of said electromagnetic signal detector to a user of said mobile communication device, wherein said mobile communication device communicates with a communication network via a second communication standard, and wherein said first communication standard differs from said second communication standard, and wherein said mobile communication device generates a prediction of an alert level based on a geographic location associated with said mobile communication device, wherein said prediction is based on an analysis of a detection by said electromagnetic signal detector, and wherein at least one of said user interface and said electromagnetic signal detector communicates said prediction to said user.

8. The mobile communication device of claim 7, wherein said data is communicated to said user based at least partially on a user input from said user interface.

9. The mobile communication device of claim 7, wherein said prediction is communicated to said user as a probability.

10. The mobile communication device of claim 7, wherein said prediction is further based on an analysis of at least one of a heading, a speed, an acceleration and a driving pattern associated with a motor vehicle in which said mobile communication device is located.

11. The mobile communication device of claim 7, wherein said data comprises information related to at least one of a geographic location, a speed, an acceleration, and a navigation route associated with a motor vehicle that is associated with said mobile communication device.

12. The mobile communication device of claim 7, wherein said mobile communication device is at least one of a mobile phone, a cellular phone, a smart phone, a satellite phone, a personal digital assistant, a navigation system, a mobile phone communication component, a portable computer, a laptop computer, and a tablet computer.

13. The mobile communication device of claim 7, wherein said user interface comprises a control for adjusting a setting associated with said electromagnetic signal detector.

14. The mobile communication device of claim 13, wherein said setting comprises at least one of a mode of operation, a detection sensitivity, an output, and an alert threshold.

15. The mobile communication device of claim 13, wherein said control comprises at least one of a touch screen interface and a button.

16. The mobile communication device of claim 7, wherein said mobile communication device automatically interfaces with said electromagnetic signal detector based upon a triggering event.

17. The mobile communication device of claim 16, wherein said triggering event comprises said mobile communication device entering a communication range associated with said electromagnetic signal detector.

18. A mobile communication device that interfaces with an electromagnetic signal detector, comprising:
  a communication component that facilitates communication of data with said electromagnetic signal detector via a first communication standard, wherein said mobile communication device is separate from said electromagnetic signal detector; and
  a user interface that is operable to manage an operation of said electromagnetic signal detector and communicates information regarding said operation of said electromagnetic signal detector to a user of said mobile communication device, wherein said mobile communication device communicates with a communication network via a second communication standard, and wherein said first communication standard differs from said second communication standard, and wherein said user interface comprises a map, wherein a radar event is depicted in association with said map and wherein said user interface facilitates management of said radar event by said user.

19. The mobile communication device of claim 18, wherein management of said radar event comprises at least one of removing said radar event, modifying said radar event, and confirming said radar event.

20. The mobile communication device of claim 19, wherein management of said radar event generates radar event data, wherein said radar event data is communicated to at least one of said electromagnetic signal detector and a server via said second communication network.

21. The mobile communication device of claim 18, wherein while a vehicle associated with said mobile communication device is in motion, management of said radar event is at least one of prevented and limited.

22. A computer program product for a mobile communication device that interfaces with an electromagnetic signal detector, the computer program product comprising:
  a non-transitory, tangible computer readable storage medium storing computer executable program code that, when executed by a processor, causes said mobile communication device to perform a method comprising:
    a) receiving data from said electromagnetic signal detector via a first communication standard;
    b) communicating said data with a communication network via a second communication standard, wherein said first communication standard differs from said second communication standard; and
    c) communicating said data to at least one of a user of said mobile communication device and a user of an other device based at least partially on a user input from a user interface of said mobile communication device.

23. The computer program product of claim 22, wherein the method further comprises receiving a prediction of an alert level from a server based on a geographic location associated with said mobile communication device via said second communication standard, wherein said prediction is based on an analysis of a plurality of detections by at least one electromagnetic signal detector, and further comprising at least one of said user interface and said electromagnetic signal detector communicating said prediction to said user of said mobile communication device.

24. The computer program product of claim 22, wherein the method further comprises said mobile communication device automatically executing said computer program product based upon a triggering event.

25. The computer program product of claim 24, wherein said triggering event comprises said mobile communication device entering a communication range associated with said electromagnetic signal detector.

26. The computer program product of claim 25, wherein said communication range comprises a range associated with said first communication standard.

27. A mobile communication device, comprising:
  a communication element that receives a prediction of an alert level from a server based on a geographic location associated with said mobile communication device via a communication network, wherein said prediction is based on an analysis of data related to at least one of law enforcement activity, traffic conditions, a hazard, an alert, a school zone, a hospital zone, a weather condition, a geographic location, and a navigation route, and a user interface that communicates to a user of said mobile communication device at least one of said data and said prediction.

28. The mobile communication device of claim 27, wherein said data is communicated to said user based at least partially on a user input from said user interface.

29. The mobile communication device of claim 27, wherein said prediction is further based on an analysis of at least one of a heading, a speed, an acceleration and a driving pattern associated with a motor vehicle in which said mobile communication device is located.

30. The mobile communication device of claim 27, wherein said prediction is further based on historical data regarding driving patterns associated with said user.

31. The mobile communication device of claim 27, wherein said prediction is based upon a weighted analysis of said data.

32. The mobile communication device of claim 31, wherein said weighted analysis applies a greater weight to said data received within a threshold timeframe.

33. The mobile communication device of claim 27, wherein said user interface communicates said prediction to said user via at least one of an audio output, a mechanical output, and a visual output.

34. The mobile communication device of claim 33, wherein said audio output comprises at least one of a beep, a buzz, a voice response, and a tone.

35. The mobile communication device of claim 27, wherein said user interface communicates said prediction to said user via an operatively associated external device.

36. The mobile communication device of claim 35, wherein operatively associated external device comprises at least one of an external speaker and a component of a vehicle.

37. The mobile communication device of claim 27, wherein said prediction causes an associated navigation component to suggest an alternate navigation route.

38. The mobile communication device of claim 27, wherein said data comprises custom data comprising at least one of a customized alert, a customized hazard, a customized traffic condition, and a customized navigation route.

39. The mobile communication device of claim 38, wherein said custom data comprises a customized entry associated with a geographic location for said mobile communication device.

40. A server for a mobile communication device that communicates predictions to a user of said mobile communication device, comprising:
    a reception element that receives communication from a mobile communication device wherein said mobile communication device is operable to communicate via a first communication standard;
    a aggregation component that aggregates data from at least one of said mobile communication device and an electromagnetic signal detector;
    an analysis algorithm that analyzes said data, wherein analyzing said data identifies a portion of aggregated data based on a geographic location associated with said mobile communication device; and
    a transmission element that facilitates communication of said identified portion of aggregated data via a second communication standard to said mobile communication device based on a geographic location associated with said mobile communication device; wherein said mobile communication device generates a prediction based upon said identified portion of aggregated data, and wherein a user interface of said mobile communication device communicates said prediction to a user of said mobile communication device, and wherein said first communication standard differs from said second communication standard.

41. The server of claim 40, wherein said data further comprises at least one of a law enforcement activity, traffic conditions, a hazard, an alert, a school zone, a hospital zone, and a weather condition associated with said geographic location.

42. The server of claim 40, wherein said prediction is communicated to said user based at least partially on a user input.

43. The server of claim 42, wherein said user input is from said user interface.

44. The server of claim 40, wherein said transmission element further facilitates communication of said aggregated data to an other device, wherein said other device comprises at least one of a navigation device, said electromagnetic signal detector, and a vehicle output.

45. The server of claim 40, wherein said reception element further receives communication from at least one of a second server and an electromagnetic signal detector.

46. The server of claim 40, wherein said mobile communication device communicates said prediction to an other device via a first communication standard, wherein said other device comprises at least one of a navigation device, said electromagnetic signal detector, and a vehicle output.

47. The server of claim 40, wherein said mobile communication device communicates said prediction to server.

48. A computer program product for a mobile communication device, the computer program product comprising:
    a non-transitory, tangible computer readable storage medium storing computer executable program code that, when executed by a processor, causes said mobile communication device to perform a method comprising:
        a) receiving a prediction of an alert level from a server based on a geographic location associated with said mobile communication device via a communication network, wherein said prediction is based on an analysis of data, wherein said data comprises information related to at least one of a geographic location, a heading, a speed, an acceleration, and a navigation route;
        b) receiving a user input from a user interface of said mobile communication device; and
        c) communicating said prediction to a user of said mobile communication device based at least partially on said user input.

* * * * *

UNITED STATES PATENT AND TRADEMARK OFFICE
CERTIFICATE OF CORRECTION

PATENT NO.        : 9,135,818 B2                                           Page 1 of 1
APPLICATION NO.   : 13/840640
DATED             : September 15, 2015
INVENTOR(S)       : Washlow et al.

It is certified that error appears in the above-identified patent and that said Letters Patent is hereby corrected as shown below:

IN THE SPECIFICATION

Column 4, line 14: delete "preclude or and/modify" and insert --"preclude and/or modify"--

Signed and Sealed this
Twenty-second Day of March, 2016

Michelle K. Lee
*Director of the United States Patent and Trademark Office*